United States Patent [19]

Andersson et al.

[11] Patent Number: 4,614,587
[45] Date of Patent: Sep. 30, 1986

[54] WASTEWATER TREATMENT METHOD

[75] Inventors: Per-Erik Andersson, Sundsvall; Thomas G. Welander, Malmö, both of Sweden

[73] Assignee: Purac Aktiebolag, Lund, Sweden

[21] Appl. No.: 717,673

[22] Filed: Mar. 29, 1985

[30] Foreign Application Priority Data

Apr. 11, 1984 [SE] Sweden .............................. 8402018

[51] Int. Cl.$^4$ .............................................. C02F 3/28
[52] U.S. Cl. ..................................... 210/603; 210/631; 210/928; 435/167; 48/197 A
[58] Field of Search ...................... 210/603, 631, 928; 435/167, 801; 48/197 A

[56] References Cited

U.S. PATENT DOCUMENTS

| 4,172,785 | 10/1979 | Knoorre et al. | 210/96.1 |
| 4,200,523 | 4/1980 | Balmat | 210/631 |
| 4,415,453 | 11/1983 | Witt et al. | 210/631 |

FOREIGN PATENT DOCUMENTS

| 2253661 | 5/1973 | Fed. Rep. of Germany . |
| 2648892 | 1/1978 | Fed. Rep. of Germany . |
| 57-136996 | 8/1982 | Japan | 210/631 |
| 57-167795 | 10/1982 | Japan | 210/603 |
| 59-19590 | 2/1984 | Japan | 210/603 |
| 60-25594 | 2/1985 | Japan | 210/631 |

OTHER PUBLICATIONS

Biotechnology & Bioengineering, vol. XXV, "Precipitation, Chelation, and the Availability of Metals as Nutrients in Anaerobic Digestion", I. Methodology, pp. 1947-1957, and II. Applications, pp. 1959-1972, (1983).
Canadian Pulp and Paper Association, Technical Section, 69th Annual Meeting, (1983), pp. 209-216.
Journal WPCF 55, vol. 55, No. 10, "Treatment of Coal Gasification Wastewater with Anaerobic Filter Technology", Suidan et al., pp. 1263-1270 (1983).

Primary Examiner—Benoit Castel
Attorney, Agent, or Firm—Burns, Doane, Swecker & Mathis

[57] ABSTRACT

At anaerobic treatment of wastewaters from forestry industries there is the problem, that the wastewaters contain toxically acting complexing agents. According to the invention this problem is solved by the addition of a metal selected from the group iron, calcium, magnesium and aluminum.

5 Claims, 2 Drawing Figures

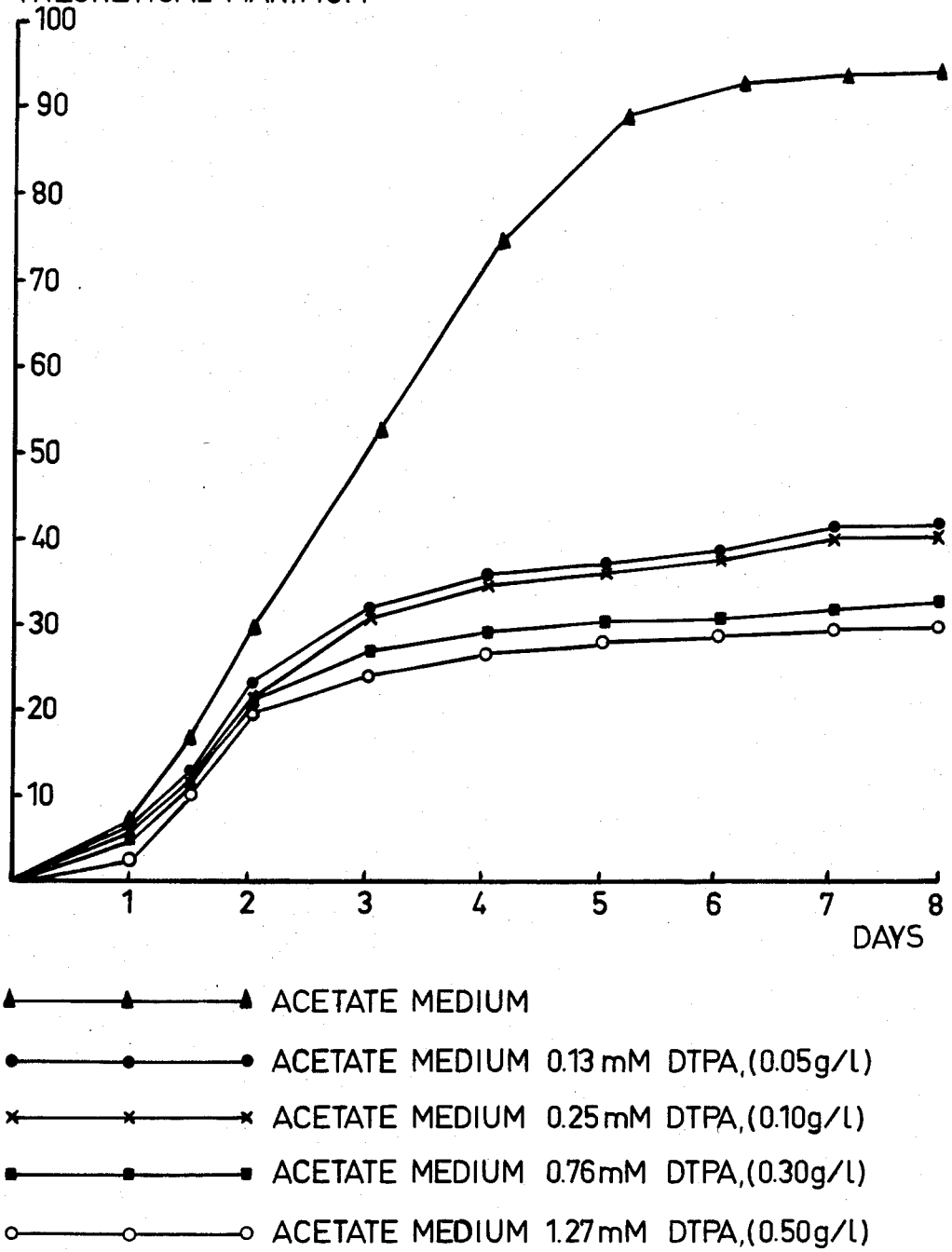

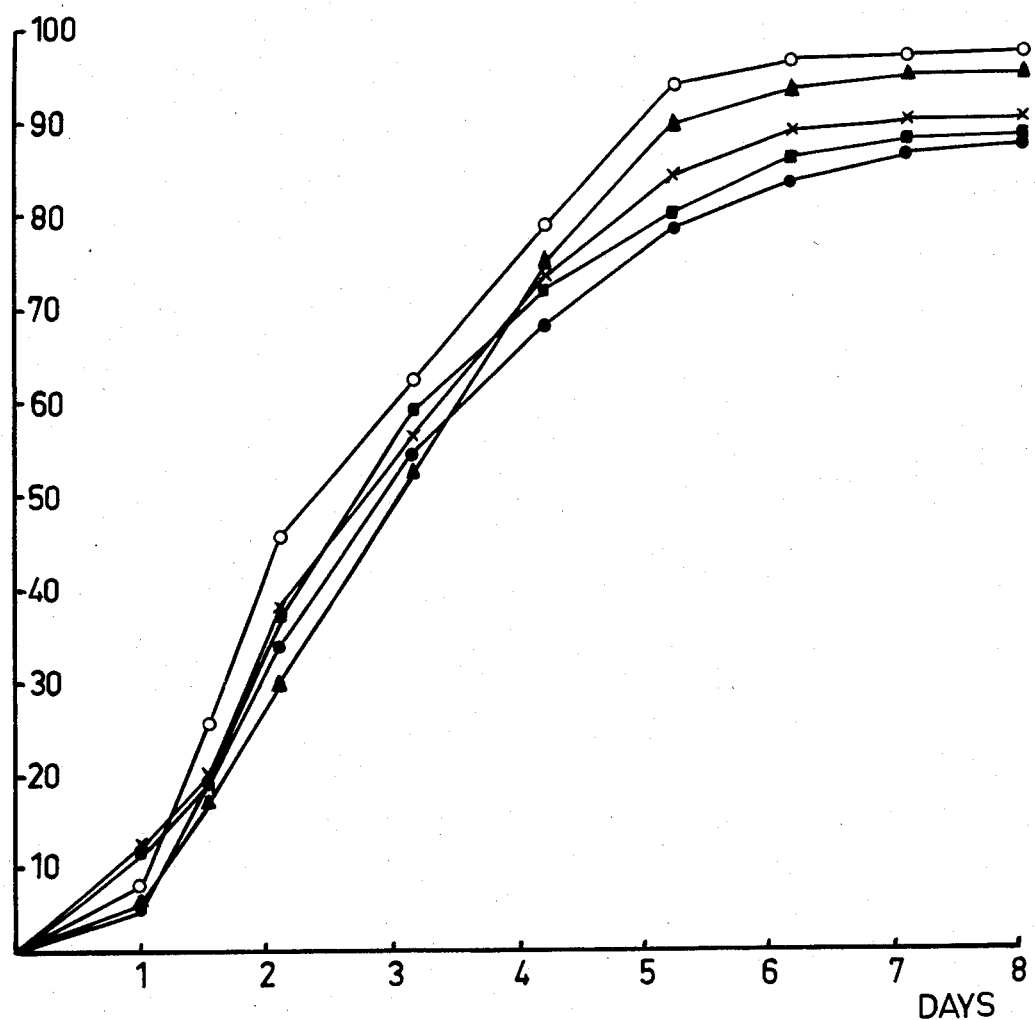

WASTEWATER TREATMENT METHOD

BACKGROUND OF THE INVENTION

This invention relates to a method at the anaerobic treatment of wastewaters from the forest industry which contain strong toxically acting complexing substances. Strong complexing agents here are to be understood to be such which are characterized in that the logarithm for their complexing constant with bivalent iron exceeds about 8.5.

The microbial decomposition of complex organic compounds to methane and carbon dioxide occurs via several different steps. One very important intermediate product is acetate. It was proved that about 70% of the methane formation occurs via acetate at the anaerobic decomposition of carbohydrates. At anaerobic decomposition of easily decomposable organic compounds the methane formation from acetate is that step in the decomposition chain which limits the speed. The efficiency degree obtainable with anaerobic treatment of a certain water, therefore, depends to a large extent on how favourable the environment is, or can be made, for the bacteria group which effects the conversion of acetate to methane, the so-called acetoclastic methanogenes. Problems of considerable difficulty can arise when the water in question contains substances toxic for these organisms. Fortunately, the acetoclastic methanogenes, like most bacteria, have a good capacity of adapting themselves to their surrounding, in spite of their strong inhibiting effect at the beginning.

At several experiments carried out with wastewaters from the forest industry, especially with wastewater from the manufacture of chemi-mechanical pulp, toxic effects have proved to arise on acetoclastic methanogenes. After a certain time, however, an adaptation could take place. The methanogenes, however, have shown to have a considerably lower growth speed in the backwater than in other more favourable environments. This renders the purification much more difficult and would imply a poor performance of a full-size purification works. For obtaining a good result it is, therefore, of greatest importance to optimize the environment of the bacteria. It was found at continued experiments, that complexing substances had a toxic effect on the anaerobic decomposition. At experiments with backwater from chemi-thermo mechanical pulp manufacture the complexing agent diethylenetriamine pentaaectic acid (DPTA) could be identified as strongly toxic. It is certainly previously known in other connections to add calcium carbonate, but then for the purpose of effecting precipitation and, respectively, flocculation, and also to add iron salts for precipitating sulphide solved in the water.

SUMMARY OF THE INVENTION

This problem can be solved according to the present invention by the addition of iron, calcium, magnesium and/or aluminum ions.

According to the invention, however, it is understood that the metal ions in question must be added in specific amounts for obtaining the desired effect. For the metals iron and aluminum, thus, shall $0.1 < y < 10$, preferably $0.3 < y < 2$ and for the metals calcium and magnesium $1 < y < 10$, preferably $2 < y < 3$ where y is the mole ratio metal/complexing agent.

The invention is illustrated in greater detail in the following by some embodiments and with reference to the accompanying diagrams.

DESCRIPTION OF THE DRAWINGS

FIG. 1 is a diagram of gas development versus time for different amounts of complexing agent; and FIG. 2 is a diagram of gas development versus time for different amounts of complexing agent and metal additive.

DESCRIPTION OF THE PREFERRED EMBODIMENT

The graft culture used at all runs was an enrichment culture which had been cultivated in continuous cultivation on a medium on acetate basis for about 1 year.

The runs were carried out in a plurality of 100 ml sprayers especially designed for this type of runs.

At the beginning of the runs, each sprayer was charged with 10 ml of the enrichment culture, 30 ml of a special acetate medium and possibly some other additive. The sprayers were then sealed with rubber membranes. The gas development in the sprayers was then observed by reading the position of the spray pistons, and the gas composition was determined regularly by taking a gas sample out of the sprayers by means of a cannula through the rubber membranes and analysing the samples gaschromatographically.

EXAMPLE 1 (Comparative)

This series of runs shows the inhibiting effect of the complexing agent DTPA on methane formation from acetate. Five sprayers were filled each with 10 ml graft and 30 ml acetate medium. In addition, different amounts of DTPA were charged to the different sprayers so that the final concentrations of DTPA were 0, 0.13, 0.25, 0.76 and, respectively, 1.27 mM. The gas formation in the sprayers was then observed during 20 days. The procedure during the first eight days is shown in FIG. 1. After these days no further gas development did occur in any one of the sprayers.

The procedure in the sprayer without DTPA is entirely normal. After a short adaptation phase a maximum gas development is obtained until the acetate starts to cease, and the curve planes.

The sprayers were DTPA, however, yield a different result. In these sprayers the gas production ceased long before all available acetate was consumed. It also can be seen that the gas yield decreases with increasing DTPA concentration. The curves indicate clearly that it was not the availability of acetate, but something different, which caused the limitation of the activity of the methane bacteria.

EXAMPLE 2

This series of runs shows the effect of the addition of iron on the methane formation in the presence of a complexing agent.

Five sprayers were filled each with 10 ml graft and 30 ml acetate medium. Four of the sprayers also were charged with DTPA and Fe(II)-chloride, so that the final concentrations in the respective sprayer were: 0.25 mM DTPA and 0.50 mM Fe(II), 0.76 mM DTPA and 0.76 mM Fe(II), 0.76 mM DTPA and 1.52 mM Fe(II) and, respectively, 1.27 mM DTPA and 2.53 mM Fe(II). The gas development was observed during 20 days. After the first eight days no additional gas was developed. The procedure during the first eight days is shown in FIG. 2.

It can be seen from the curves that the procedure was similar in all five sprayers. The inhibiting effect of DTPA observed in Example 1 is eliminated when iron-(II) ions are present in the ratio 1:1 or 2:1 to DTPA.

The invention is not restricted to the embodiment described, but can be varied within the scope of the spirit of the invention idea.

We claim:

1. A method for anaerobically treating wastewaters from manufacture of mechanical pulp from forest industries which contain strong toxically acting complexing substances having a logarithm for their complexing constant with bivalent iron exceeding about 8.5 comprising adding to the water prior to or at the anaerobic treating step at least one metal selected from the group iron, calcium, magnesium and aluminum, the metals iron and aluminum being added in such an amount that:

$$0.1 < y < 10;$$

and the metals calcium and magnesium being added in such an amount that:

$$1 < y < 10,$$

where y is the mole ratio of metal/complexing agent.

2. A method according to claim 1, wherein the metal is iron.

3. A method according to claim 1, wherein for the metals iron and aluminum, $0.1 < y < 2$.

4. A method according to claim 3, wherein the metal is iron.

5. A method according to claim 1, wherein for the metals calcium and magnesium, $2 < y < 3$.

* * * * *